US008432292B2

(12) United States Patent
Visel et al.

(10) Patent No.: US 8,432,292 B2
(45) Date of Patent: Apr. 30, 2013

(54) MACHINE TOOL

(75) Inventors: Benjamin Visel, Schwieberdingen (DE); Georg Stellmann, Ludwigsburg (DE); Sebastian Jackisch, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 889 days.

(21) Appl. No.: 12/557,586

(22) Filed: Sep. 11, 2009

(65) Prior Publication Data
US 2010/0148976 A1    Jun. 17, 2010

(30) Foreign Application Priority Data

Dec. 16, 2008  (DE) .......................... 10 2008 054 698

(51) Int. Cl.
*G08B 21/00*  (2006.01)

(52) U.S. Cl.
USPC ..... 340/680; 340/679; 340/686.1; 340/686.6; 340/573.1; 83/13; 83/58

(58) Field of Classification Search .................. 340/680, 340/679, 686.1, 686.5, 686.6, 573.1; 307/326, 307/330; 192/128, 130; 83/13, 62, 63, 360, 83/367, 478, 58
See application file for complete search history.

(56) References Cited

U.S. PATENT DOCUMENTS

| | | | | |
|---|---|---|---|---|
| 4,928,612 A | * | 5/1990 | Hiramatsu et al. | 112/257 |
| 5,796,341 A | * | 8/1998 | Stratiotis | 340/573.1 |
| 7,924,164 B1 | * | 4/2011 | Staerzl | 340/573.1 |
| 2011/0113939 A1 | * | 5/2011 | Simon | 83/13 |
| 2011/0167970 A1 | * | 7/2011 | Niehsen et al. | 83/13 |

* cited by examiner

*Primary Examiner* — Hung T. Nguyen
(74) *Attorney, Agent, or Firm* — Michael J. Striker

(57) ABSTRACT

A machine tool, in particular a stationary saw, includes a worktable and a safety device which is designed to trigger a reaction as a function of a safety signal, and which includes a signaling device which displays a state of the safety device. The signaling device includes a display which is located on a surface of a worktable and/or above the surface of the worktable.

14 Claims, 4 Drawing Sheets

MACHINE TOOL

CROSS-REFERENCE TO RELATED APPLICATION

The invention described and claimed hereinbelow is also described in DE 10 2008 054 698.4 filed on Dec. 16, 2008. This German Patent Application, whose subject matter is incorporated here by reference, provides the basis for a claim of priority of invention under 35 U.S.C. 119(a)-(d).

BACKGROUND OF THE INVENTION

The present invention relates to a machine tool.

A machine tool, in particular a stationary saw, which includes a worktable and a safety device which is designed to trigger a reaction as a function of a safety signal, and which includes a signaling device which displays a state of the safety device has already been proposed.

SUMMARY OF THE INVENTION

Accordingly, it is an object of the present invention to provide a machine tool which is a further improvement of the existing machine tools.

A machine tool of the invention, in particular a stationary saw, includes a worktable and a safety device which is designed to trigger a reaction as a function of a safety signal, and which includes a signaling device which displays a state of the safety device.

It is provided that the signaling device includes a display which is located on a surface of a worktable, and/or above the surface of the worktable. A "safety signal" refers, in particular, to a signal having at least one element of information that may be used to protect an operator. Advantageously, a "reaction" refers to emergency braking which may stop a tool, guiding a tool in a safe region by moving the tool and/or the safe region, warning the operator using a warning signal, and/or another type of reaction that appears reasonable to a person skilled in the art. The term "safe region" refers, in particular, to a region in which it is unlikely that the tool will be touched by the operator. In particular, a "safe region" refers to a region under the worktable, and/or a region under a guard hood.

A "display" refers, in particular, to elements that are used to forward signals of the display in an operation, e.g. by illuminating them or passing illumination through them. The expression "above the surface" means, in particular, that the display is located in a region that extends from a plane, which is the surface, in a direction in which work pieces are machined in an operation. A "stationary saw" refers, in particular, to a saw that remains at least partially unmoved relative to an environment during a sawing procedure, e.g. a table-top circular saw, a cross saw, a miter saw, a slide miter saw, and/or another type of saw that appears reasonable to a person skilled in the art. A "worktable" refers, in particular, to a surface on which a work piece is placed during a machining process, and/or over which a work piece is moved during a machining process.

"Provided" is intended to mean, in particular, specially equipped, designed, and/or programmed. Via the design of the machine tool according to the present invention, it is possible to continually display a state of the safety device, via the display, to the operator while a work piece is being machined since, based on a viewing region of the operator in various typical working positions of the operator, the display is always situated within an optical perception range of the human eye having correct color perception, and in a vicinity of a visual focus of the perception range.

In a further embodiment, it is provided that the display includes at least one display means for actively displaying an inactivity of the safety device. An "inactivity" refers, in particular, to the absence of readiness of the safety device to stop a tool, and/or to an absence of readiness of the safety device to detect that the tool should be stopped. An "active display" refers, in particular, to a display that may transmit information by outputting a signal. Advantageously, by actively displaying the inactivity of the safety device, an operator may be warned about the inactivity in a manner that is reliable and has a simple design.

It is also provided that the display includes at least one display means for actively displaying a "ready-for-use" state of the entire safety device. The expression "a 'ready-for-use' state of the entire safety device" is intended to mean, in particular, that an entire functional chain of the safety device is in a state in which it may provide an intended type of protection. By actively displaying the "ready-for-use" state of the safety device, the operator may advantageously and unambiguously know when the operator is protected by the safety device. In particular, an operator recognizes immediately when a safety device is deactivated.

Furthermore, it is provided that the display is designed to unambiguously display exactly two states. In this context, "unambiguously" is intended to mean, in particular, that, due to the simplicity of the two states of the display, an operator is able to reliably assign them to unique states of the safety device. Due to the unique display of only two states, it is possible to effectively minimize confusion regarding the display or misinterpretation of the display.

It is also provided that the display is designed to emit light, at the least, in at least two different colors. In particular, the display emits light in a visible frequency range. Preferably, in at least one operating state, the display always emits light in only one of two colors. The colors are selected such that an operator may easily distinguish between the two particularly easily. Advantageously, the wavelength of the two colors differs by at least 50 nm, and particularly advantageously they differ by at least 100 nm. Since light is emitted in two different colors, it is possible to assign the states in a particularly unambiguous manner.

It is also provided that the display includes at least one display means which is designed as an LED. An "LED" refers, in particular, to a light-emitting diode. It is feasible to use LEDs of different sizes. As an alternative, it is also possible to use, for the display, fan-shaped laser light, or a light from another light source that appears reasonable to a person skilled in the art, the light being transmitted in the direction of the surface of a worktable, e.g. from a lamp located in the safety device. By using at least one LED as the display means, it is possible to provide an energy-efficient, cost-favorable display means having a long service life.

In a further embodiment, it is provided that the display includes at least one linear display means, thereby making it possible to attain particularly good visibility. The linear display means may be an optical waveguide, e.g. a glass fiber, having at least one LED as the light source.

Furthermore, a tool-accommodating region is provided, around which the display is situated on at least two sides. Advantageously, the display is situated essentially parallel to and/or at a right angle to a main working direction of the machine tool. The terms "parallel to" and "at a right angle to" are also intended to mean, in particular, parallel to or at a right angle to with a deviation of ±25°, advantageously ±10°, and particularly advantageously ±5°. A "main working direction"

is intended to mean, in particular, a direction in which a work piece or the tool is moved during machining. By using a display that is situated on two sides, visibility may be ensured when one side of the display is hidden.

Furthermore, a tool-accommodating region is provided, around which the display is situated in a U-shaped manner. The term "U-shaped" is intended to mean, in particular, that the display is situated on three sides of the tool-accommodating region essentially parallel to and at a right angle to the main working direction. By using a U-shaped configuration, visibility of the display may be advantageously increased.

The machine tool also includes at least one safety element in which the display is at least partially situated. A "safety element" is understood to mean, in particular, an element that provides mechanical protection to an operator against contact with the tool, e.g. a guard rail and/or a guard cap. By locating the display in the safety element, good visibility of the display may be attained even when the working surface is completely covered by a work piece, and components and design expenditure may be advantageously eliminated.

Furthermore, at least one safety element is provided, which includes at least one optically semi-transparent region and which is designed to direct light emitted by the display through the at least one optically semi-transparent region. An "optically semi-transparent region" is intended to mean, in particular, a region of the safety element which re-radiates at least 1%, advantageously at least 10%, and particularly advantageously at least 90% of incoming light energy in a visible frequency range. Using the light that is directed through the safety element, it is possible to attain a particularly advantageous, space-saving design of the display and the display means, e.g. in a tool-accommodating region and/or directly on the safety element.

It is furthermore provided that the safety device is designed to stop a tool based on at least one element of sensor information. The sensor information may be ascertained, e.g. by a VIS/INIR sensor (infrared sensor), a UWB sensor (ultra wideband sensor), a capacitive sensor, or another type of sensor that appears reasonable to a person skilled in the art. By triggering a stoppage of the tool using a sensor, it is possible to attain particularly effective protection via a rapid response of the sensor.

In a further embodiment, a sensor is provided, the information from which makes it possible, in at least one operating mode of the sensor, to distinguish between a work piece and a body part of an operator. For example, depending on the type of sensor, it is not possible, in an operating mode for cutting metal, for the sensor to distinguish between the work piece and a body part of the operator. By distinguishing between the work piece and the body part, the safety device may operate in a particularly efficient and targeted manner.

Further advantages result from the description of the drawing that follows. Five embodiments of the present invention are shown in the drawings. The drawing, the description and the claims contain numerous features in combination. One skilled in the art will also advantageously consider the features individually and combine them to form further reasonable combinations.

DESCRIPTION OF THE PREFERRED EMBODIMENTS

Figure 1:
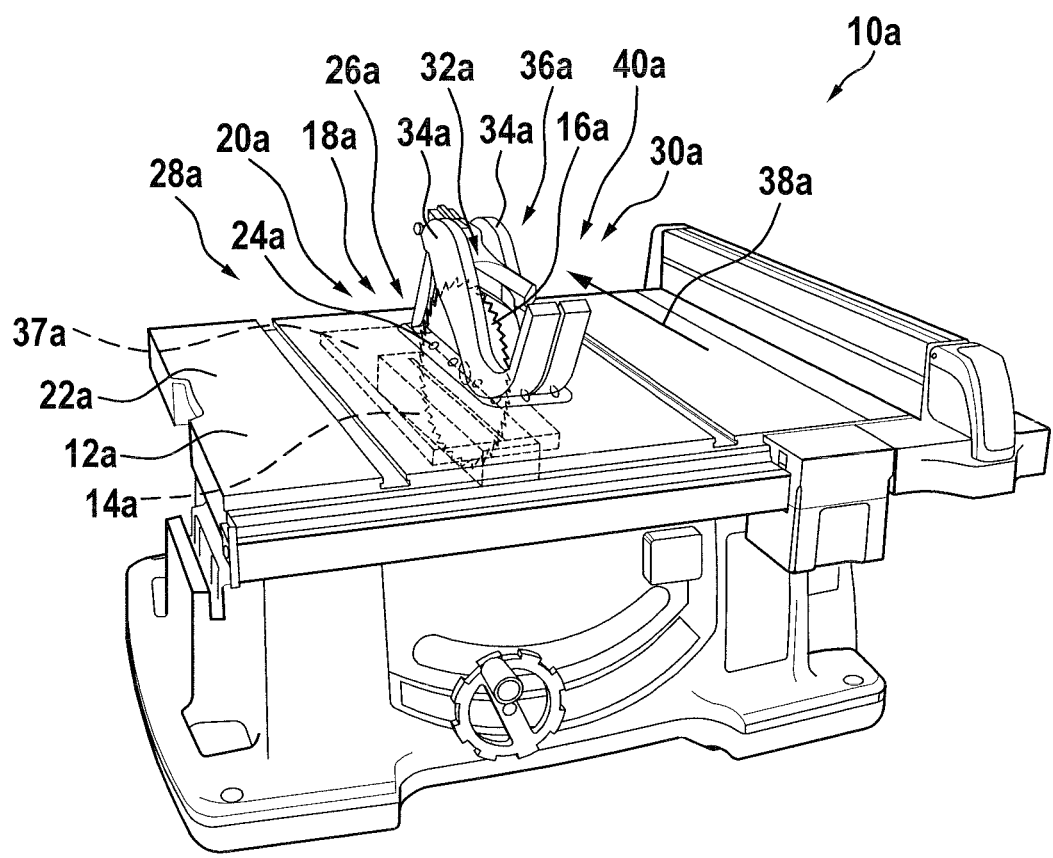
FIG. 1 shows a schematic overview of a machine tool which includes a signaling device.

FIG. 1 shows a machine tool 10a designed as a table-top circular saw and including a horizontal worktable 12a and a safety device 14a which, in response to a safety signal to engage emergency braking, stops a tool 16a which is designed as a circular saw blade. Machine tool 10a includes a signaling device 18a which displays a state of safety device 14a. Tool 16a is situated in the center of worktable 12a, and is oriented perpendicularly to a surface 22a of worktable 12a.

Safety device 14a stops tool 16a based on at least one element of sensor information. To this end, the safety device includes a sensor (not depicted), the information from which makes it possible, during operation of machine tool 10a, to distinguish between a work piece 37a and a body part of an operator, in particular a hand. The sensor is designed as a UV/VIS/NIR sensor and operates using light having a wavelength between 300 nm and 2000 nm. Using the sensor, the presence of a material type is detected via the spectral evaluation of a light in a range of 2 cm around tool-accommodating region 26a. Using the sensor, a computer unit (not depicted) detects whether a body part of the operator is dangerously close to or is in contact with tool 16a.

Figure 2:
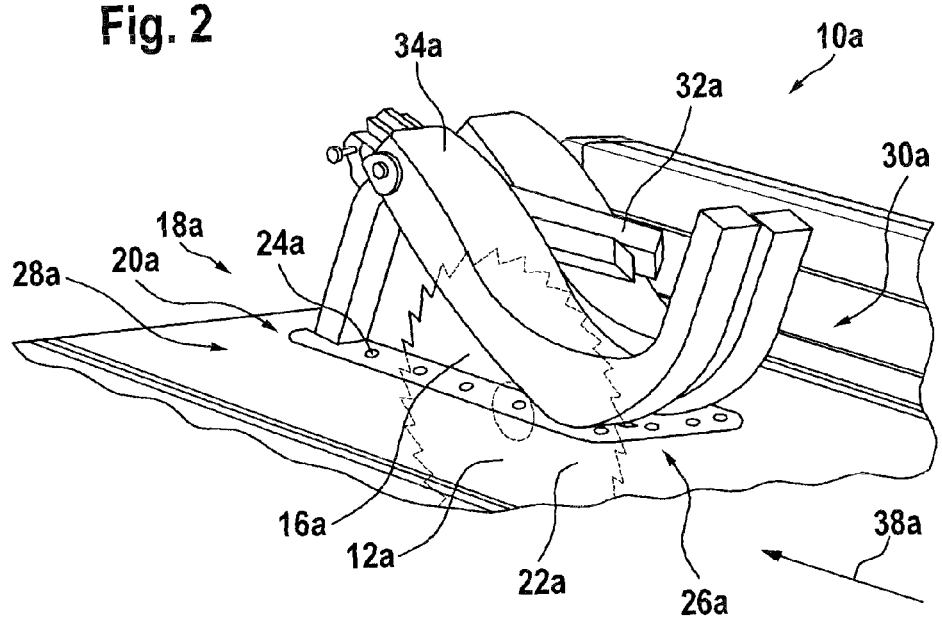
FIG. 2 shows a schematic depiction of the signaling device in FIG. 1, in a first embodiment.

FIG. 2 shows signaling device 18a which includes a display 20a situated on surface 22a of worktable 12a. Display 20a includes display means 24a which are designed as an LED, and which are situated in a U-shaped manner around a tool-accommodating region 26a which includes machine tool 10a. One row of display means 24a is situated on each of the sides 28a, 30a of tool 16a parallel to a main working direction 38a of machine tool 10a. A third row of display means 24a is situated in main working direction 38a in front of tool 16a, and is oriented perpendicularly to main working direction 38a. Display means 24a of display 20a show, using an active display, an inactivity of safety device 14a and a "ready-for-use" state of entire safety device 14a. For this purpose, display means 24a of display 20a may display exactly two states in an unambiguous manner by emitting light in two different colors, which are red and green in this case. If an operator has deactivated safety device 14a, display means 24a emit red light. If safety device 14a is ready for use, display means 24a emit green light. If an operator sees green light while working, he knows that safety device 14a is ready for use.

Further embodiments of the present invention are depicted in FIGS. 3 through 6. To differentiate the embodiments, the letter "a" in the reference numerals used for the embodiment in FIGS. 1 and 2 is replaced with letters "b" through "e" in the reference numerals for the embodiments shown in FIGS. 3 through 6. The description below is essentially limited to the differences from the embodiment in FIGS. 1 and 2. With regard for the components, features, and functions that remain the same, reference is made to the description of the embodiment in FIGS. 1 and 2.

Figure 3:
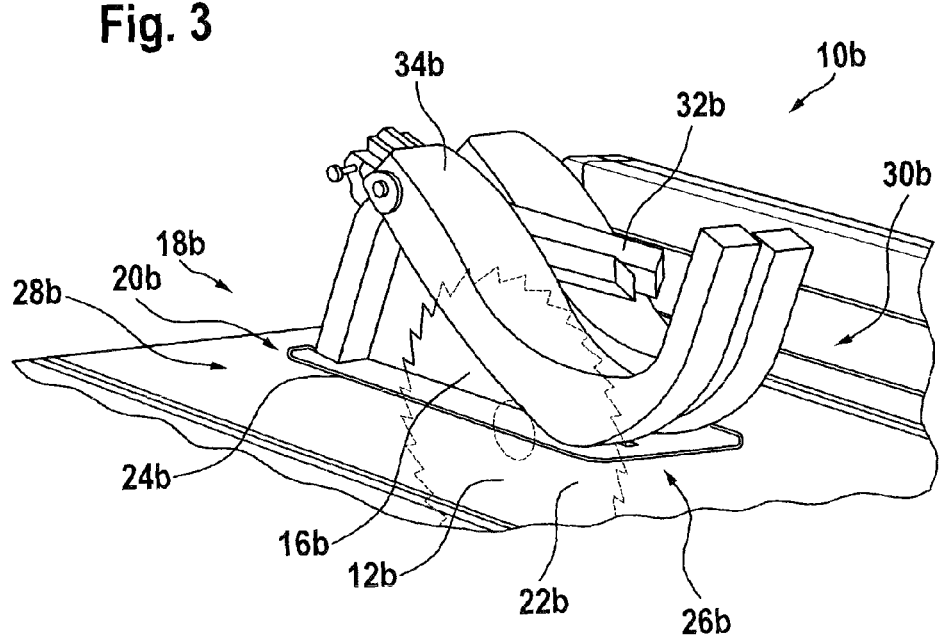
FIG. 3 shows a schematic depiction of the signaling device which includes a linear display, in a second embodiment.

A second embodiment of a signaling device 18b is shown in a schematic depiction in FIG. 3. Signaling device 18b includes a display 20b which includes linear display means 24b. Linear display means 24b are situated in a U-shaped manner on a surface 22b of a worktable 12b around a tool-accommodating region 26b of machine tool 10b.

Figure 4:
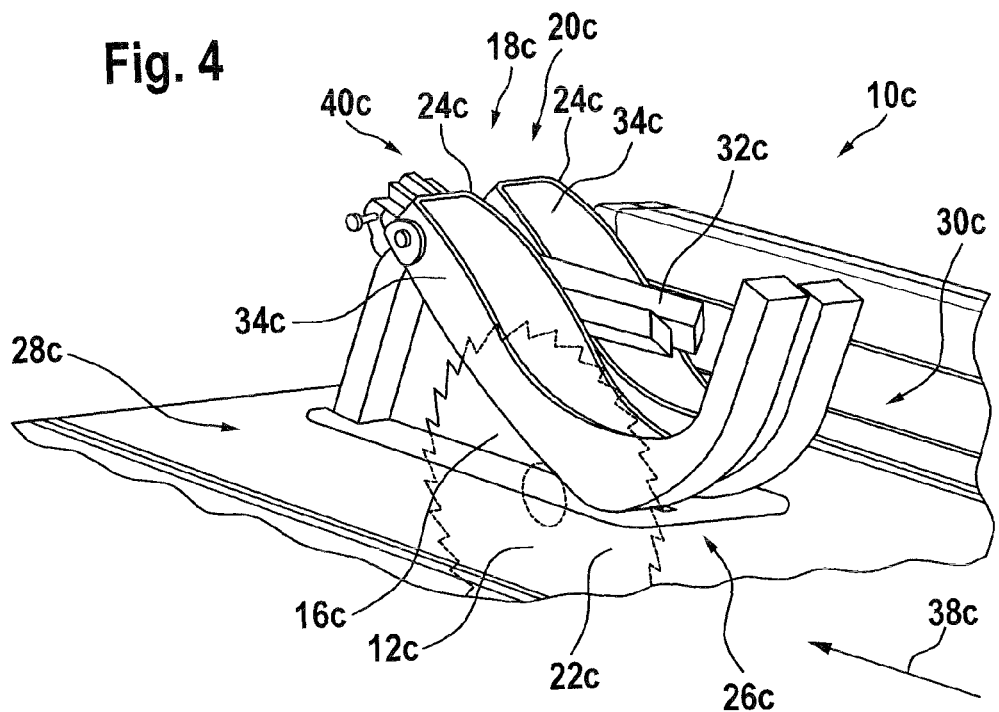
FIG. 4 shows a schematic depiction of the signaling device which is located in a safety element, in a third embodiment.

A third embodiment of a signaling device 18c is shown in a schematic depiction in FIG. 4. Signaling device 18c includes a display 20c which includes two linear display means 24c. Linear display means 24c of display 20c are situated in a safety element 34c of machine tool 10c on a top side 40c of safety element 34c above a surface 22c of a worktable 12c, and they extend along an outer contour of safety element 34c. Safety element 34c is manufactured of plastic and is designed as a curved device; it extends, divided into two pieces, on two sides 28c, 30c of a tool-accommodating region 16c, 26c parallel to a main working direction 38c.

Figure 5:
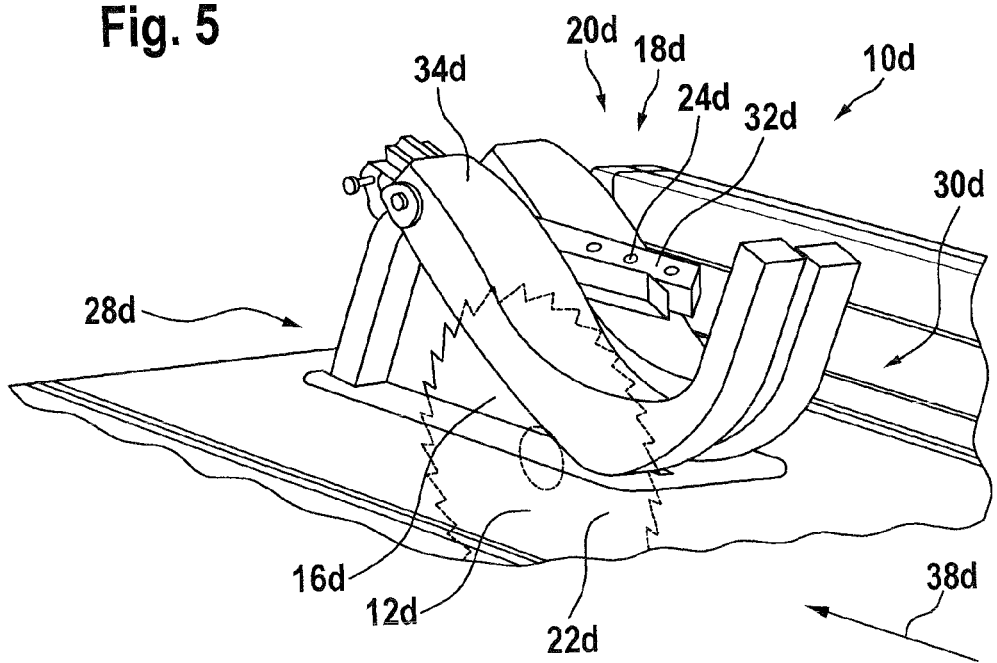
FIG. 5 shows a schematic depiction of the signaling device which is located in a safety element, in a fourth embodiment.

A fourth embodiment of a signaling device 18d is shown in a schematic depiction in FIG. 5. Signaling device 18d of a hand-held power tool 10d includes a display 20d which includes display means 24d designed as LEDs. Display means 24d of display 20d are situated in a two-pieced safety element 32d designed as a guard rail, above a surface 22d of a worktable 12d. Safety element 32d and display 20d are situated above a tool 16d on two sides 28d, 30d, parallel to a main working direction 38d.

Figure 6:
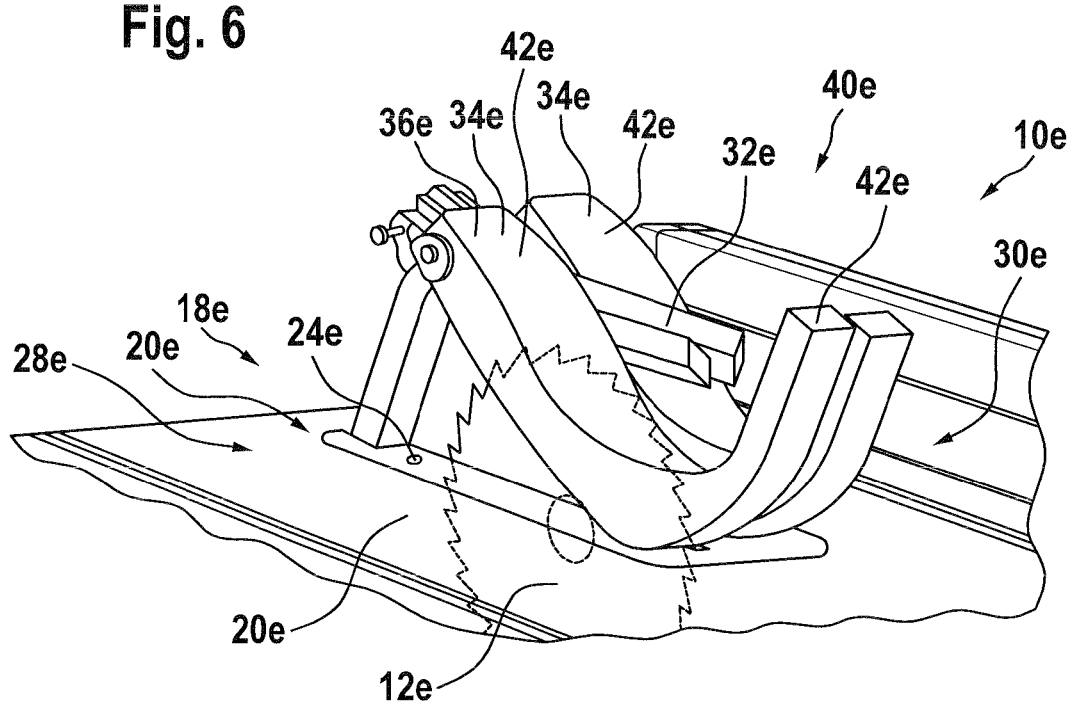
FIG. 6 shows a schematic depiction of a signaling device which includes a semi-transparent safety element, in a fifth embodiment.

A fifth embodiment of a signaling device 18e is shown in a schematic depiction in FIG. 6. Signaling device 18e includes a display 20e which includes display means 24e which are designed as a laser. Display means 24e of display 20e are situated in a worktable 12e in such a manner that light emitted by display means 24e strikes optically semi-transparent regions 36e of a safety element 34e of machine tool 10e. Safety element 34e is situated above a surface 22e of worktable 12e. Safety element 34e is manufactured of plastic and is designed as a curved device; it is divided into two pieces and is situated on two sides 28e, 30e of a tool 16e parallel to tool 16e. Safety element 34e includes optically semi-transparent regions 36e which direct light emitted by display means 24e to exit surfaces 42e situated on a top side 40e of safety element 34e.

It will be understood that each of the elements described above, or two or more together, may also find a useful application in other types of constructions differing from the types described above.

While the invention has been illustrated and described as embodied in a machine tool, in particular for manufacturing fiber-reinforced components, it is not intended to be limited to the details shown, since various modifications and structural changes may be made without departing in any way from the spirit of the present invention.

What is claimed is:

1. A machine tool, comprising: a worktable; a safety device configured to trigger an emergency braking reaction as a function of a safety signal; a signaling device which displays a state of said safety device, where said signaling device includes a display which is located in a position selected from the group consisting of on a surface of said worktable, above the surface of said worktable, and both.

2. The machine tool as defined in claim 1, wherein said display includes at least one display means for actively displaying an inactivity of said safety device.

3. The machine tool as defined in claim 1, wherein said display includes at least one display means for actively displaying a "ready-for-use" state of said device in its entirety.

4. The machine tool as defined in claim 1, wherein said display is configured to display exactly two states in an unambiguous manner.

5. The machine tool as defined in claim 1, wherein said display is configured to emit light.

6. The machine tool as defined in claim 5, wherein said display is configured to emit the light in at least two different colors.

7. The machine tool as defined in claim 1, wherein said display includes at least one display means which is configured as an LED.

8. The machine tool as defined in claim 1, wherein said display includes at least one linear display means.

9. The machine tool as defined in claim 1, further comprising a tool-accommodating region around which said display is situated on at least two sides.

10. The machine tool as defined in claim 1, further comprising a tool-accommodating region around which said display is situated in a U-shaped manner.

11. The machine tool as defined in claim 1, further comprising at least one safety element in which said display is at least partially situated.

12. The machine tool as defined in claim 1, further comprising at least one safety element which includes at least one optically semi-transparent region, and which is configured to direct light emitted by said display through the at least one optically semi-transparent region.

13. The machine tool as defined in claim 1, wherein said safety device is configured to stop a tool based on at least one element of sensor information.

14. The machine tool as defined in claim 13, further comprising a sensor, a sensor information from which, in at least one operating mode of the sensor, makes it possible to distinguish between a workpiece and a body part of an operator.

* * * * *